UNITED STATES PATENT OFFICE.

EBENEZER KENNARD MITTING, OF CHICAGO, ILLINOIS, ASSIGNOR TO ALBERT DOMEIER, OF LONDON, ENGLAND, AND JAMES A. KIRK, JOHN B. KIRK, MILTON W. KIRK, AND WALLACE F. KIRK, OF CHICAGO, ILLINOIS.

PROCESS OF RECOVERING SALT AND CRUDE GLYCERINE FROM SPENT SOAP-LYE.

SPECIFICATION forming part of Letters Patent No. 419,610, dated January 14, 1890.

Application filed January 21, 1889. Serial No. 297,048. (No specimens.)

*To all whom it may concern:*

Be it known that I, EBENEZER KENNARD MITTING, a subject of the Queen of Great Britain, residing at Chicago, in the county of Cook and State of Illinois, have invented a certain new and useful Process of Recovering Salt and Crude Glycerine from Spent Soap-Lye, of which the following is a specification.

In carrying out my invention I first treat the lye with lime by intimately mixing lime therewith, and allow the resulting precipitate containing the lime and impurities to settle. In place of lime I may use another alkaline earth, as, for example, magnesia. The quantity of lime employed varies according to the quality of the lye under treatment; but I find from one-eighth of one per cent. to one-half of one per cent. usually sufficient. Enough should be used, however, to obtain the maximum effect of clarification. I draw off the clarified lye, passing it through a filter, if necessary, and then and without further treatment concentrate it by boiling until it reaches a degree of heat, say, about 300° Fahrenheit. During the boiling nearly all the water is eliminated, passing off as steam, and the salts crystallize and are deposited in the vessel. Such salt I remove, either during or at the close of the operation, and purify it to render it white and merchantable. This I do by washing the obtained salt with an alkaline-saturated solution of common salt. I find a good proportion for such solution to be, saturated solution of common salt, ninety-seven parts; saturated solution caustic or carbonated soda, three parts. The product is boiled to about 300° Fahrenheit. I now neutralize with sulphuric, hydrochloric, or other economical acid, allow the resulting precipitate to settle, and draw off the clear liquor, which is crude glycerine of good quality and fit for distillation.

Some spent soap-lyes, more especially those which contain a large proportion of gelatinous, albuminous, resinous, and the like impurities, are not susceptible to purification to the fullest extent by treatment or repeated treatments with lime while in their natural state. In the case of such lyes I therefore, after the first treatment with lime, as above described, proceed with the boiling down or evaporation to or near to the saturation-point—*i. e.*, until the said lyes become saturated, or nearly saturated, with the salts therein contained by reason of the evaporation of a portion of the water therefrom, and in this condition I again treat such lyes with lime exactly as before, and thus complete their purification, after which I proceed with the boiling down or concentration to finishing-point, and complete the process as above described.

I claim—

1. In the process of recovering salt and glycerine from spent soap-lye, the herein-described improvement, which consists, first, in adding lime to the lye and removing therefrom the precipitate thus formed, then boiling down without further treatment to the finishing-point of about 300° Fahrenheit, and then neutralizing with acid and removing the precipitate, substantially as specified.

2. The herein-described improvement in the process of recovering salt and glycerine from spent soap-lye, which consists in first adding lime to the lye and removing therefrom the precipitate thus formed, then concentrating or boiling down the lye until it is saturated or nearly saturated with salt, then again treating with lime and removing the precipitate, then boiling down without further treatment to the finishing-point of about 300° Fahrenheit, and then neutralizing with acid and removing the precipitate, substantially as described.

3. In the process of recovering salt and glycerine from spent soap-lye, the herein-described improvement, which consists in adding lime to the liquor, removing the precipitate thus formed, boiling down the liquor without further treatment to the finishing-point, removing the salt thus produced either during or at the end of the operation, and finally purifying the salt by washing with a solution of common salt rendered alkaline by the addition of a small percentage of caustic or carbonated alkali, substantially as specified.

4. The herein-described improvement in the process of recovering salt and glycerine from spent soap-lye, which consists in adding lime to the lye, removing the precipitate thus formed, concentrating or boiling down the lye until it is saturated or nearly saturated with salt, then again treating with lime and removing the precipitate, then boiling down the lye without further treatment to the finishing-point, removing the salt thus produced either during or at the end of the operation, and finally purifying the salt by washing with a solution of common salt which has been rendered alkaline by the addition of a small percentage of caustic or carbonated alkali, substantially as described.

EBENEZER KENNARD MITTING.

Witnesses:
 FREDERICK C. GOODWIN,
 T. D. BUTLER.